United States Patent [19]
Ueda

[11] 3,906,521

[45] Sept. 16, 1975

[54] SELF-PROCESSING CAMERA

[75] Inventor: Hiroshi Ueda, Nara, Japan

[73] Assignee: Minolta Camera Kabushiki Kaisha, Osaka, Japan

[22] Filed: July 26, 1974

[21] Appl. No.: 492,117

[30] Foreign Application Priority Data
July 28, 1973   Japan.............................. 48-84597

[52] U.S. Cl................................. 354/86; 354/187
[51] Int. Cl.²......................................... G03B 17/50
[58] Field of Search............ 354/83, 84, 85, 86, 87, 354/187

[56] References Cited
UNITED STATES PATENTS
| | | | |
|---|---|---|---|
| 2,576,022 | 11/1951 | Land.................................. | 354/83 X |
| 2,906,182 | 9/1959 | Booth.............................. | 354/83 X |
| 3,677,160 | 7/1972 | Harvey.................................. | 354/83 |

*Primary Examiner*—Monroe H. Hayes
*Attorney, Agent, or Firm*—Wolder & Gross

[57] ABSTRACT

A self-processing camera of the type employing a replaceable magazine housing a stack of self-processing film units successively advanceable from a focal plane window, includes a lens support swingable between extended and retracted positions and spring biased to its extended and releasably locked in its retracted position. A spring loaded transport mechanism is actuated with the manual retraction of the support to advance a film unit, rupture its processing agent envelope and discharge the film unit and the spring is loaded with the advance of the lens support. The transport mechanism is locked in its charged condition with the camera shutter in its cocked condition and is enabled upon the release of the shutter.

10 Claims, 10 Drawing Figures

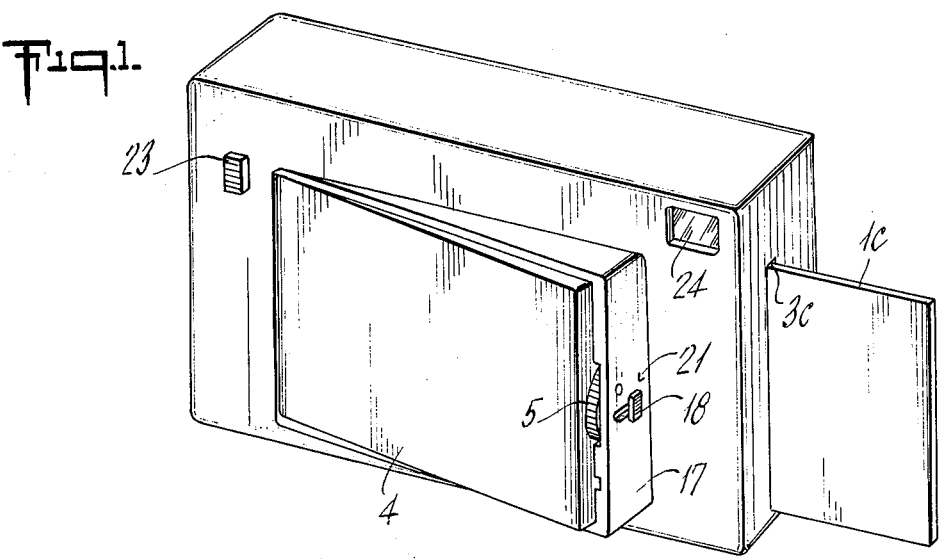
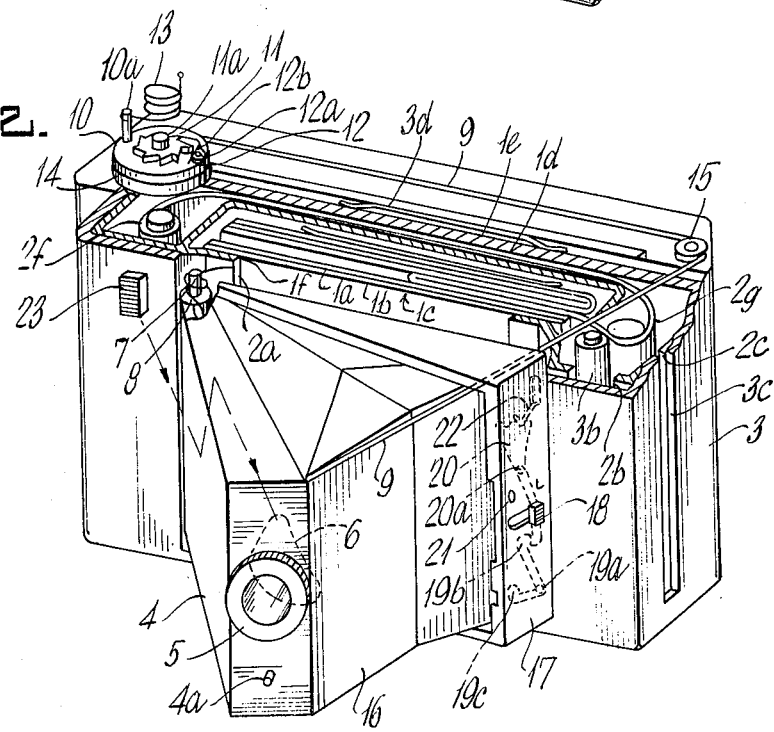
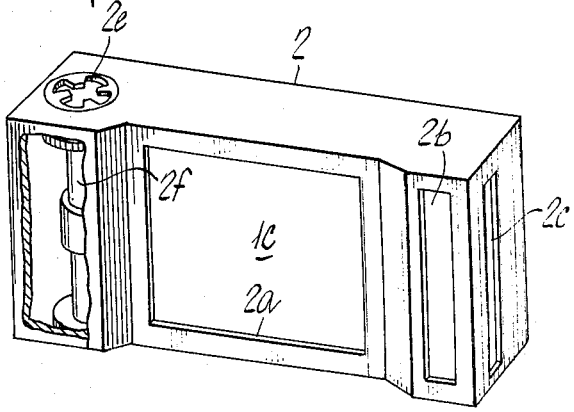

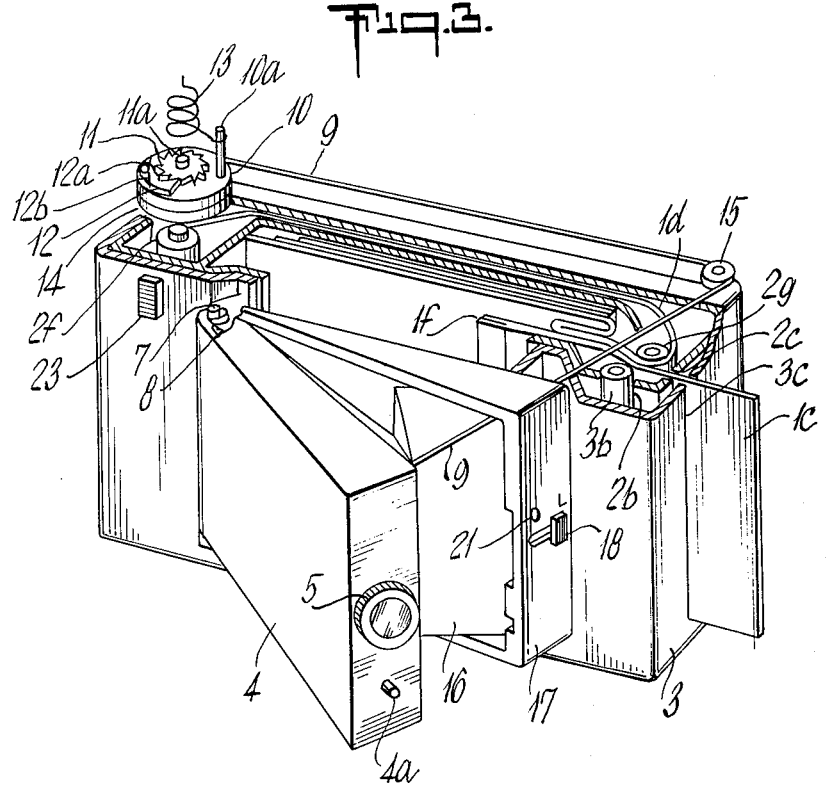
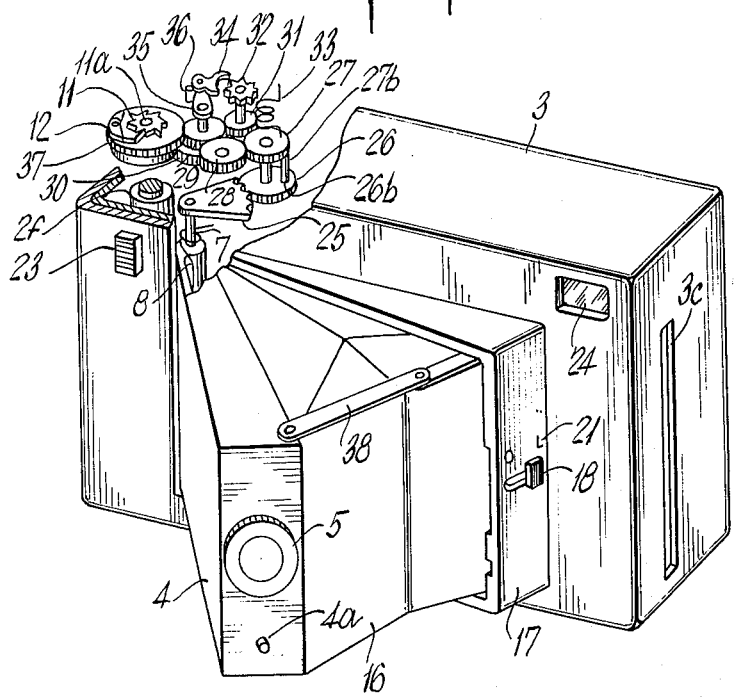

3,906,521

SELF-PROCESSING CAMERA

BACKGROUND AND SUMMARY OF THE INVENTION

The present invention relates generally to improvements in cameras and it relates particularly to an improved self-processing camera of the type employing self-processing film units of the diffusion, image-transfer type.

A conventional self-processing camera performs the development and image-transfer after exposure of the film unit to directly provide a photographic print. This procedure, however, requires the use of a relatively large size film and hence a large size camera. Accordingly, this leads to great inconvenience in carrying or handling the camera, if the lens frame or lens mount assembly is rigidly incorporated in the camera body, as in the case with the conventional small size camera. To avoid this shortcoming, there has been proposed a camera of the type, in which a lens frame body is movable from its collapsed or retracted position to its extended position, that is, to the picture taking or photographing position and vice-versa, with both positions being emcompassed with a light-tight bellows.

There has been recently available an integral or composite type self-processing film unit which includes a combination of an image receiving sheet and a photosensitive sheet integral therewith for accommodating the diffusion image-transfer process, thus eliminating the need to superpose one sheet on top of another or to peel one sheet from another to obtain a photographic print. In this self-processing composite film unit, the developing process is performed by using the aforesaid integral arrangement of both sheets to obtain a photographic print.

With the self-processing composite film unit of this type, the processing agent or liquid is contained in a processing agent containing means which is separated from both the image receiving sheet and the photosensitive sheet, before processing, and the aforesaid processing containing means is so designed as to be ruptured after exposure, whereby the processing agent is uniformly distributed between the both sheets.

It is preferable in this case that the aforesaid processing be carried out, at the time when the self-processing film unit, which has been exposed in its normal exposure position, is advanced or discharged from the camera by means of a film transport means. To this end, the camera body is provided with a film transport means and a pressure or squeeze roller located in the transport path of the film unit, whereby when the self-processing film unit after exposure is advanced by the transport means from the exposure position to the outside of the camera, the film unit traverses the pressure roller to thereby rupture the processing-agent containing means and release the processing agent to be distributed over the entire surfaces of the both film unit sheets for processing.

An object of the present invention is to provide a self-processing camera which is highly convenient in handling or carrying and wherein the film advance or transport means may be driven in association with the movement of the lens frame body from its retracted position to its extended position and then to the retracted position, relative to the main body of a camera.

According to one aspect of the present invention, the film unit transport means is so constructed as to be driven in association with the movement of the camera lens frame body from its extended position to its retracted position, because the processing is desirably performed immediately after the exposure. For this purpose, the film unit transport mechanism or means is provided with a loadable or chargeable drive member such as a spring, whereby the drive member is charged by the movement of the lens frame body from its extended position to its retracted position. The drive member is released from its charged position when the lens frame body is moved from its extended position to its retracted position, and the transport means is thus driven. As a result, a uniform distribution of the processing agent is achieved for the both sheets of the self-processing film unit. To this end, a governor may be provided which cooperates with the aforesaid operation to release the drive member.

In addition, according to another aspect of the present invention, there is provided a drive means for the lens frame for driving it from its retracted position to its extended position. Moreover, for this purpose, there are provided means for locking the lens frame body to the main body of the camera in its retracted position and a lock-releasing member therefor.

It is sometimes desirable to move the lens frame body to its extended position, without effecting an exposure, and then back to the retracted position. In this case, however, the unexposed self-processing film unit in the exposure position would normally be advanced and wasted. To overcome this shortcoming, according to the present invention, there is provided a power transmitting member which precludes the transport of the self-processing film unit by the transport means, even if the lens frame body is moved from its extended position to its retracted position, with the shutter not being released, the aforesaid power transmitting member being located between the shutter release mechanism and the camera transfer means.

Accordingly, the present invention contemplates the provision of a self-processing camera of the type, in which, as has been described above, the lens frame body is movable between a retracted position and an extended position, in which the exposure is effected. The retracted position of the lens frame body affords a great convenience in the handling or carrying of the camera. The self-processing camera according to the present invention is featured by a mechanism in which the self-processing film unit after its exposure, is automatically advanced for processing and then discharged from the camera, in association with the movement of the lens frame body from its extended position to its retracted position, thus obviating any complicated means for transporting the self-processing film unit in a stable condition after exposure, and any electric power consumption for transporting the film unit is eliminated, resulting in many other efficacies which would not otherwise be attained by the prior art self-processing camera.

BRIEF DESCRIPTION OF THE DRAWINGS

FIG. 1 is a perspective view of a camera embodying the present invention, the lens frame body being shown in its retracted or collapsed position;

FIG. 2 is a partially fragmented view similar to FIG. 1, wherein the lens frame body is shown in its retracted position and the magazine being shown omitted;

FIG. 3 is a view similar to FIG. 1 showing the lens frame body being moved from its extended position to its retracted position;

FIG. 4 is a perspective view of the magazine of the above embodiment;

FIG. 5 is a perspective view, partially broken away, of another embodiment of the present invention in which the lens frame body is shown in its extended position;

FIGS. 8(A) to 8(C) illustrate the component parts of the control and actuating mechanism of the above embodiments showing the relationship between a shutter mechanism used in the aforesaid embodiments, its release member, and the releasing mechanism of the transport means, in which FIG. 8(A) shows the lens frame body in its extended position and a shutter charged condition, FIG. 8(B) shows the condition at the time the shutter is released and FIG. 8(C) shows the lens frame body in its retracted position.

DESCRIPTION OF THE PREFERRED EMBODIMENTS

Figure 6:
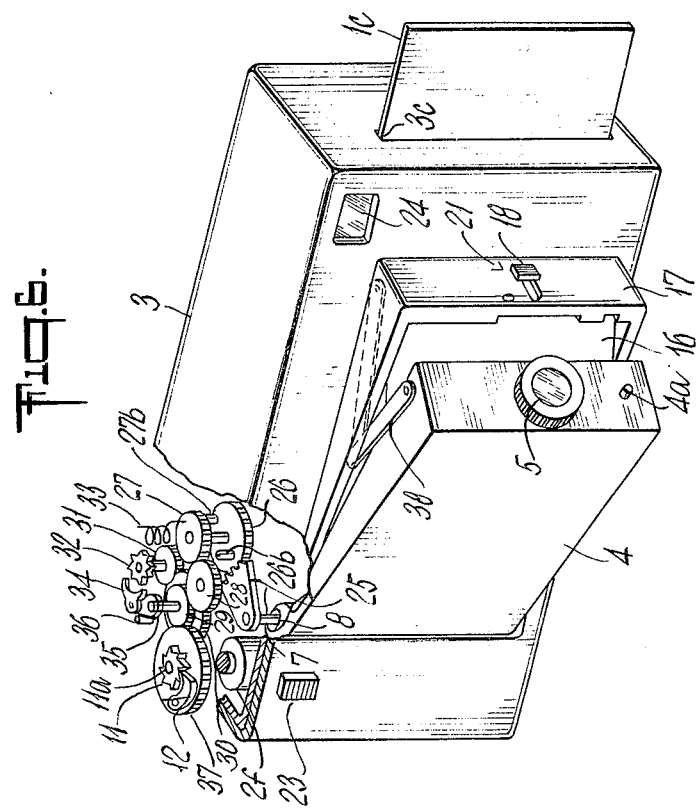
FIG. 6 is a view similar to FIG. 5 with the lens frame body shown moving to its retracted position.

Referring now to the drawings, particularly FIGS. 1 to 4 thereof which illustrates a preferred embodiment of the present invention, the reference numeral 1c generally designates an image recording or film composite unit integrally consisting of a photosensitive sheet 1a and an image receiving sheet 1b and which is shown in its exposure position as will be hereinafter described, with the lens frame body being shown in its extended position.

The image recording unit 1c is provided at one end thereof with a processing agent containing means or envelope 1e and at its other or trailing end with a trap 1f. The containing means 1e contains a processing agent and the trap 1f is intended to receive and retain the excess processing agent after the film unit processing, that is, after the processing agent containing means 1e has been ruptured and the agent released. These components constitute a single self-processing composite film unit 1, and a guide paper backing for transporting the film unit is disposed on the back of the unit 1.

A magazine 2 houses one or more self-processing film units and a take-up member 2f is rotatably provided in an end portion thereof for taking up the guide paper 1d, the take-up member 2f being formed with a clutch portion 2e which is engageable with a feed ratchet 14 provided on the body proper 3 of a camera. The magazine 2 is provided in its front face with an exposure light opening 2a defining an exposure window or frame, the aforesaid opening being in register with an exposure light frame 3a, when the magazine 2 is mounted in the body of the camera. Provided in the rear surface of the magazine is a compression spring 2d which urges the self-processing film unit against the periphery of the exposure light opening 2a. In the righthand portion of the magazine, there is formed an opening 2b, through which is inserted a pressure roller 3b to be hereinafter described, in side-by-side relation with the exposure light opening 2a. Provided in facing relation to the opening 2b is a receiving portion 2g adapted to press the self-processing film unit 1 in cooperation with the aforesaid pressure roller 3b. Provided in the righhand side-surface of the magazine is a slit 2c, through which the self-processing film unit 1 is discharged.

The body 3 of the camera is provided with an exposure light frame 3a registering with the exposure light opening 2a in the camera mounted magazine 2; a pressure roller 3b, part of which enters the magazine 2 through the opening 2b; a discharge slot 3c, through which the self-processing film unit 1 is discharged from the camera and which registers with the slot 2c; and a compression spring 3d provided on the inner rear surface of the camera body 3, the compression spring 3d functioning to urge the magazine against the border of exposure light frame 3a. Designated 4 is a lens frame body having a photographing lens 5 and a shutter 6. The lens frame 4 is swingable about a shaft 7 on the camera body 3 and resiliently urged or biased in a clockwise rotational direction under the action of a spring 8 as viewed in FIG. 2. A collapsible light shielding bellows 16 is provided between a lens frame cover wall 17 and the lens frame body 4. Accordingly, the lens frame body 4 is movable between the retracted position relative to the cover wall 17, as shown in FIG. 1, and the extended position as shown in FIG. 2. The extended position of the lens frame body is governed by a cord 9 as will be hereinafter described. However, a locating ring 38 as shown in the second embodiment may substitute the cord 9. The optical axis of the photographing lens 5 is at a right angle to the center line of the exposure light frame 3a, when the lens 5 is in its extended position.

The cord 9 serves to transmit the swing motion of the lens frame body 4 to the camera body 3 to thereby operate the transfer means. Thus, one end of the cord 9 is secured to the lens frame body 4, and extends along a corner of the cover wall 17, then into the camera body 3 so as not to cause any leakage of light therethrough, and then around a pulley journalled in the camera body proper and the other end of the cord 9 is trained around an operating pulley 10 loosely mounted on a shaft 10a of the take-up member 2f of the magazine and rotatable relative to the camera body.

Provided on and projecting from the operating pulley 10 is a pin 10a, with a helical drive spring 13 of a coil form being confined between the pin 10a and the camera body 3. The drive spring 13 rotationally loads or biases the pulley 10 in a counter-clockwise direction so as to wind the spring 9 therearound. However, the force of the drive spring 13 is lower than that of the spring 8 for extending the lens frame body. The drive spring 13 is charged, when the lens frame body 4 is advanced to its extended position by means of the spring 8.

Rigidly mounted on the shaft 11a of the operating pulley 10 is a ratchet 11, and a pawl 12 is rotatably journalled on a shaft 12a above the operating pulley 10 and is urged in a counter-clockwise direction by a spring 12b. Thus, when the operating pulley 10 rotates in a clockwise direction to charge the drive spring 13, the pawl 12 permits the rotation of the ratchet 11, such that the lens frame body 4 is rotated to its retracted position. When the operating pully 10 is urged to rotate in the counter-clockwise direction under the action of drive spring 13, the pawl 12 engages the teeth of the ratchet 11 to likewise rotate in the counter-clockwise direction. A feed ratchet or coupling member 14 is mounted on the shaft 11a and engages the clutch portion 2e of the magazine 2, when the magazine 2 is charged in the camera body. The diameter of the operating pulley 10 is such that a single retracting movement of the lens frame body causes the guide paper 1d to transfer a single self-processing unit to the desired position.

A release button 18 provided on the cover wall 17, is movable between an 'L' position and an 'O' position relative to an index 21, the 'L' position corresponding to the locking operation of the lens frame body 4 in its retracted position and the 'O' position corresponding to the releasing of the body 4. The tip of a lever 20, which is swingable about a shaft 20a in connection with the movement of the button 18, is trifurcated, with a click spring 22 being pressed against the tip, thus retaining the release button in its respective positions. An L-shaped locking lever 19 has one end 19b in engagement with the lever 20 and is journalled to the cover wall 17 by means of a shaft 19a, while the other end thereof is formed with a hooked portion 19c. Accordingly, when the release button 18 is in 'L' position, the hooked portion 19c engages the pin 4a when the lens frame body 4 is moved to the retracted position to thereby lock the lens frame body 4 against the extending force due to the spring 8. On the other hand, when the release button 18 is in 'O' position, the hooked portion 19c releases the lens frame body from its locked position.

A shutter release button 23 provided on the camera body 3 is electrically or mechanically connected to the shutter 6. Also located on the camera body is a finder opening.

In the operation of the arrangement described above, when a picture is to be taken, with the lens frame body 4 being in its retracted position relative to the camera body, the release button 18 is shifted to to 'O' position and the engagement of the pin 4a by the hooked portion 19c of the locking lever 19 is thus released, whereupon the lens frame body is advanced to its extended position by spring 8. Then, the cord 9 is pulled to rotate the operating pulley 10 in a clockwise direction to charge the drive spring 13. The length of the cord 19 allowed to be paid out, limits the extended position of the lens frame body 4. In this respect, the optical axis of the photographing lens 5 is maintained at a right angle to the center line of the image recording unit 1c of the self-processing film unit 1 which faces the opening 2a in the exposure position.

The lens 5 is then adjusted for the distance of the photographic object and the release button 23 is depressed and the shutter 6 thus operated to expose the image recording unit.

Thereafter, the lens frame body 4 is swung from its extended position to its retracted position against the action of the spring 8, and the operating pulley 10 is rotated in a clockwise direction by means of the drive spring 13, thereby rotating the feed ratchet 14 in the same direction by way of the ratchet mechanism 11, 12, so that the feed ratchet 14 rotates the take-up member 2f by way of the clutch portion 2e to thereby take up the guide paper 1d. This then causes the guide paper 1d to drive the self-processing film unit 1 to the right, whereby the processing agent containing means 1e located to the right is urged between the pressure roller 3d and the receiving means 2g to be ruptured, and the processing agent distributed or spread uniformly between the image-receiving sheet 1b and the photosensitive sheet 1a of the self-processing film unit 1 by means of the roller 3b and the receiving means 2g, after which the self-processing film unit 1 is discharged through the slits 2c and 3c from the camera body 3.

For the subsequent photographing, the aforesaid cycle of operations is repeated.

In FIGS. 5 and 6 which show a second embodiment of the present invention, a gear mechanism is used in place of the cord in the first embodiment to transmit the extending and retracting motion of the lens frame body 4 to the film unit transport means and in the second embodiment, the limitation to the extended position of the lens frame body is achieved by a link 38.

Similar parts throughout the first and second embodiments are designated by similar reference numerals. The shaft 7, on which is rigidly mounted the lens frame body 4 which is resiliently urged to its extended position, relative to the camera body under the influence of the spring 8, is rotatably journalled in the camera body 3. The shaft 7 is formed with a sector gear 25 at an end thereof. Meshing with the sector gear 25 is a charge gear 26 which is journalled on a shaft 27a, on which is journalled a drive gear 27. Provided between the drive gear 27 and the camera body is a drive spring 33. A pin 26b mounted on and projecting from the charge gear 26 imparts a clockwise rotational bias to the drive gear 27 by means of the drive spring 33 and is engageable with a pin 27b which is mounted on and projects from the drive gear 27. However, when both pins 26b and 27b are in engagement, the counter-clockwise rotating force of the charge gear 26 under the action of the spring 8 is such as to overcome the clockwise rotating force of the drive gear 27 under the influence of the drive spring 33.

The drive gear 27 is drive coupled to an intermediage gear 30, which is rigidly mounted on a shaft 29a which is journalled in the camera body 3, by way of an idle gear 28, and the intermediate gear 30 meshes with a speed limiting gear 31 rigidly mounted on a shaft integrally and coaxially with an escape wheel 32. Another intermediate gear 29 is rigidly mounted on the shaft 29a integrally and coaxially with the gear 30, and an ankle 34, which is rotatably supported on an arm 35, confronts the escape wheel 32. The support arm 35 is frictionally urged against the shaft 29a. Thus, when the shaft 29a rotates in a clockwise direction, the ankle 34 cooperates with the escape wheel 32. On the other hand, when the shaft 29a rotates in the counter-clockwise direction, then the ankle 34 is retracted from the escape wheel 32. Shown at 36 is a stop which restricts the support arm 35 from rotation when the ankle is in its retracted position.

An operating gear 37 meshing with the intermediate gear 29 is loosely fitted on a shaft 11a. The arrangement of the pawl 12 which is adapted to engage the ratchet 11, when the former rotates in the counter-clockwise direction, and that of the feed or coupling member 14 fitted on the shaft 11a and adapted to engage the clutch portion 2e of the take-up member 2f are the same as shown in the first embodiment, the ratchet 11 being rigidly mounted on the shaft 11a and the pawl 12 being mounted on the operating gear 37.

Accordingly, when the lens frame body 4 is extended from its retracted position by the spring 8, the charge gear 26 rotates in a counter-clockwise direction, and the drive gear 27 are rotated by way of pins 26b and 27b in the counter-clockwise direction to thereby charge the drive spring 33. At this time, the shaft 29a is rotated in a counter-clockwise direction until the support arm 35 frictionally abuts the stop 36, thereby rendering inoperable the governor mechanism consisting of escape wheel 32 and ankle 34. At the same time, the operating gear 37 rotates in a clockwise direction, such that the pawl 12 and ratchet 11 do not engage each other, while the take-up member 2f remains still.

After an exposure, when the lens frame body 4 in the extended position is manually swung to its retracted position, the charge gear 26 is rotated in a clockwise direction as shown by the arrow, whereby the pin 27b of the drive gear 27 and the pin 26b are disengaged, and the drive gear 27 starts rotating in the clockwise direction under the influence of the drive spring 33. At this time, the support arm 35 rotates in a clockwise direction due to the clockwise rotation of the intermediate gear 30, whereby the governors 32, 34 are brought into an operable condition and the intermediage gear 30 rotates in the counter-clockwise direction, with its speed being restricted by the speed limiting gear 31. This speed limitation of the intermediate gear 30 restricts the speed of the operating gear 37, whereby the feed ratchet on the shaft 11a is restricted by way of pawl ratchet mechanism 11, 12, rotating the take-up member 2f to take up the guide backing paper 1d. As a result, the self-processing film 1 is fed to the right, with the speed being governed or restricted, whereby a stable processing by using the processing agent may be achieved.

Figure 7:
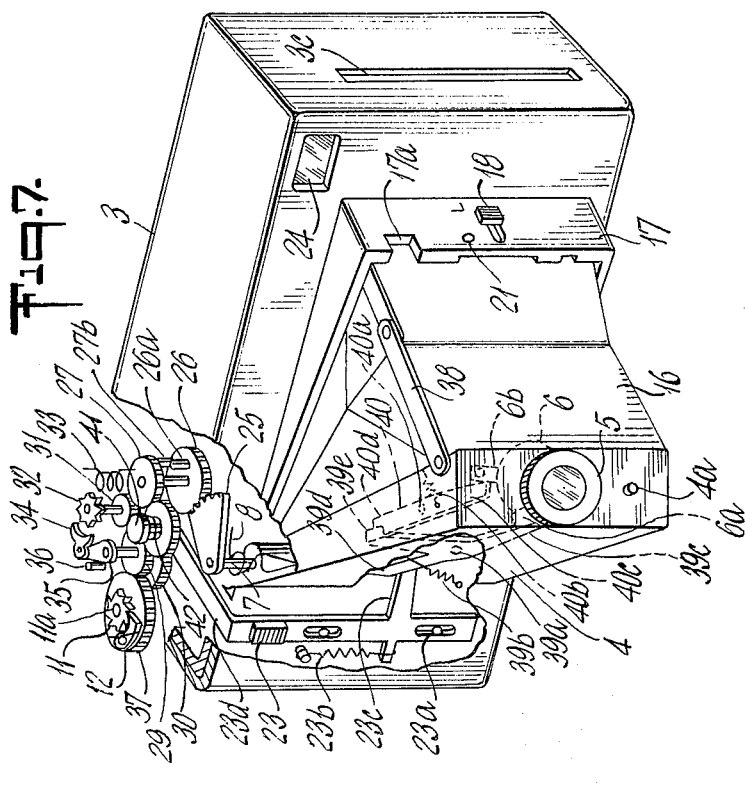
FIG. 7 is a view similar to FIG. 5, with the lens frame body being shown in its extended position.

The mechanisms described above possess the shortcomings in that an unexposed self-processing film unit 1 may be advanced and hence wasted. After the lens frame body 4 has been moved to its extended position, if no photographing is to be effected and the film unit not subjected to exposure, after which the lens frame body 4 is returned to its retracted position, then the transfer means is operated, such that the unexposed film unit is advanced and discharged from the camera body. The third embodiment shown in FIG. 7 is a modification of the second embodiment so as to overcome the aforesaid shortcoming. The similar parts to those used in the second embodiment are shown by the same reference numerals.

A shutter release button 23 is rigidly secured to a release link which is slideably movable in a vertical direction relative to the camera body 3 along a guide groove 23a, the release link being urged upwards by a spring 23b. Projecting from the release link is an arm 23c, and a bent portion 23d is formed in the upper portion of the release link.

An idle gear 28' meshing with the drive gear 27 having a drive spring 33 is loosely journalled on a shaft 41 and is slidable in the axial direction. A stop or head portion is formed at the top end of the shaft 41, and a spring 42 is entrapped between the stop and the idle gear 28', the spring 42 urging the idle gear 28' downwards. The bent portion 23d slideably abuts the underface of the idle gear 28'. The force of the spring 23b urging the idle gear 28' upwards is such as to overcome the force of the spring 42 urging the idle gear 28' downwards. Accordingly the idle gear 28' maintains an upper position, thereby interrupting the meshing relation between the drive gear 27 and the intermediate gear 29. With this arrangement, even if the charge gear 26 rotates in the clockwise direction, the rotation of the drive gear 27 is not transmitted to the operating gear 37. Thus, the idle gear 28' constitutes a clutch gear.

A T-shaped transmission lever 39, has an end 39d engaging the arm 23c, and is rotatably pivotted to the lens frame body by means of a shaft 39a. In addition, the lever 39 is urged in a counter-clockwise rotational direction by a spring 39b to thereby urge the lever end 39d to engage the arm 23c. Engageable with the other end of the transmission lever 39 is a shutter release lever 6a of shutter 6, and a cut-away portion 40d formed in an end of an arm of a lock lever 40, is engageable with the third lever arm 39e.

The lock lever 40 is rotatably journalled in the lens frame body by means of a shaft 40a and is urged to rotate in a counter-clockwise direction by a spring 40b, and the other arm end 40c of lever 40 is engageable with a charge lever 6b of the shutter 6. A charge pin 6c on the charge lever 6b projects through an opening 4c in the lens frame body 4, out of the frame body 4, and the shutter 6 is charged by manually swinging pin 6c. The cover wall 17 of the lens frame body 4 is formed with a notch 17a, which is engageable by the charge pin 6c when the lens frame body 4 is moved to its retracted position. Thus, the pin 6c is moved in a counter-clockwise direction due to the aforesaid engagement to a charged position.

With the last described arrangement, when the lens frame body 4 is moved to its extended position to charge the drive spring 33, the shutter is charged and the charge lever 6b swung in a counter-clockwise direction, such that the charge lever 6b engages the arm end 40c of the lock lever 40 to thereby rotate the lock lever 40 in a clockwise direction against the influence of the spring 40b. As a result, the locked condition of the transmission lever 39 against counter-clockwise rotation is released, and the arm end 39d thereof engages the arm 23c of the release link, which is in its upper position, to be stopped thereat, whereupon the bent portion 23d urges the clutch gear 28' upwards, thereby releasing the meshing relation of the clutch gear from the drive gear 27, as well as from the intermediate gear 29.

Figure 8A:
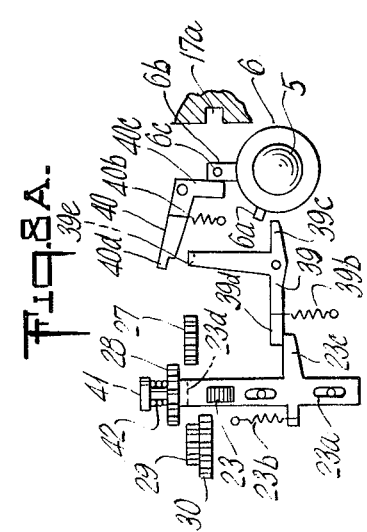
Figure 8B:
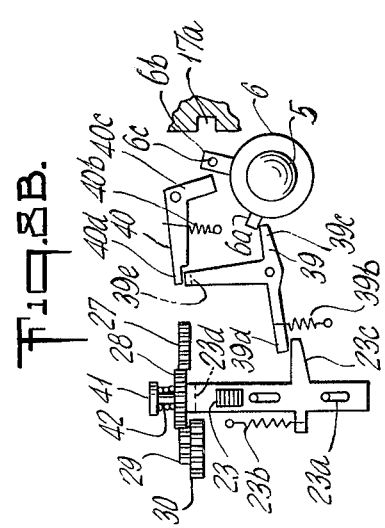
Figure 8C:
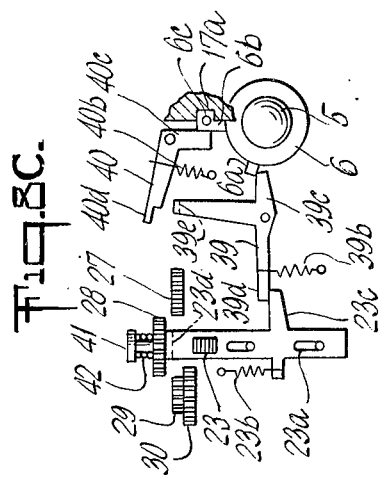

As a result, with this arrangement, if the lens frame body 4 is moved to its retracted position without effecting the releasing operation, and drive gear 27 is driven by means of the drive spring 33, the drive gear 27 remains idle, because the meshing relation between the clutch gear 28' and the drive gear 27 and intermediate gear 29 has been opened or released as shown in FIG. 8(c). As a result, the rotation of the drive gear 27 is not transmitted to the operating gear 37, so that the transport means is not operated, and the self-processing film unit not advanced.

On the other hand, when the release button 23 is depressed under the conditions shown in FIG. 8(A), and the shutter release operation thus effected, then the clutch gear 28' meshes with the drive gear 27 and intermediate gear 29 as the release link lowers, and the transmission lever 39 follows the descending arm 23c and rotates in a counter-clockwise direction under the action of the spring 39b, whereby the arm end 39c moves the release lever 6a of the shutter 6 so as to release the shutter for exposure. At this time, the release lever 6b rotates in a clockwise direction as shown in FIG. 8(B).

As a result, the locking condition of the lock lever 40 against clockwise rotation due to the release lever 6b, is released, such that the lock lever 40 rotates in the counter-clockwise direction under the action of the spring 40b, and the cut-away portion 40d engages the third arm 39e of the transmission lever 39 which has effected the release operation by rotating in a counter-clockwise direction, thereby stopping the clockwise rotation of the transmission lever 39. As a result, the release link is locked to its lower position, whereby the clutch gear 28' maintains a meshing relation with the drive gear 27 and the intermediate gear 29.

As a result, when the lens frame body 4, after the exposure, is moved to its retracted position, the charged drive spring 33 drives the drive gear 27 in the clockwise direction to rotate the operating gear 37 in the counter-clockwise direction by way of clutch gear 28' under the action of governor 32, 43, whereby the pawl and ratchet mechanism 11, 12 rotates the shaft 11a, and the feed ratchet 14 advances the self-processing film unit 1 for processing and discharge. In the final step of the film unit moving to the retracted position, the shutter charge lever 6d is charged by means of the notch 17a as shown in FIG. 8(C), and the locked condition of the release link which has been effected by the lock lever 40 by way of transmission lever 39 is released, whereby the clutch gear 28' is again disengaged from the drive gear 27.

While there have been described and illustrated preferred embodiments of the present invention, it is apparent that numerous alterations, omissions and additions may be made without departing from the spirit thereof.

I claim:

1. A self-processing camera, comprising:
 a magazine replaceably mountable to the camera and housing therein at an exposure position a film unit including a composite image receiving sheet and photosensitive sheet and a processing agent containing means separated from said sheets and rupturable to supply the processing agent thereto;
 a main camera body provided with means for transporting said film unit and a member for applying pressure to the processing agent containing means in said transported film unit, thereby rupturing said processing-agent containing means and distributing the processing agent between said both sheets;
 a lens frame body movable between a retracted position and an extended position relative to said camera body and having a shutter and a photographing lens which are directed toward said film unit when said frame body is in its extended exposure position;
 a collapsible bellows extending between said lens frame body and said camera body in light-tight fashion; and
 means responsive to the movement of said lens frame body between its extended and retracted positions for actuating said transport means to effect the advance of and processing of said film unit.

2. A self-processing camera as set forth in claim 1, wherein said transporting means includes a releasably lockable drive member and including means for charging said drive member by said lens frame body being moved from its retracted position to its extended position and which is releasable with the movement of said lens frame body from its extended position to is retracted position, said drive member being coupled to advance said film unit from said exposure position and for effecting said self-processing.

3. A self-processing camera, as set forth in claim 1, wherein said transport includes a governor limiting the speed of movement of said transport means in advancing said self-processing film unit.

4. A self-processing camera as set forth in claim 1, wherein said camera further comprises: a spring urging said lens frame body from its retracted position to its extended position; and a locking member releasably locking said lens frame body in its retracted position.

5. A self-processing camera, as set forth in claim 1, wherein said transport means effects the transportation of said self-processing film unit in response to said lens frame body being moved from its extended position to its retracted position relative to said body proper of the camera, said camera including transmission means interposed between said transport means and said shutter and responsive to the charged position of said shutter for disabling said transport means.

6. A self-processing camera comprising a main camera body, a lens carrying support mounted on said body and movable between an extended photographing position and a retracted collapsed condition, a replaceable magazine located on said camera and including a separable self-processing film unit positioned in the focal plane of said lens when said support is in its extended position, said film unit including a processing agent containing rupturable envelope, means for advancing said film unit from said magazine and rupturing said envelope to release said processing agent and discharge said film unit from said magazine, and means responsive to the movement of said support between its extended and retracted positions for actuating said advancing means.

7. The camera of claim 6 wherein said advancing means is actuated in response to the movement of said support from its extended toward its retracted position.

8. The camera of claim 6 comprising a shutter and means responsive to said shutter being in a cocked condition for disabling said advancing means.

9. The camera of claim 6 comprising a first spring urging said support toward its extended position, said advancing means including a drive member and a second spring connected to motivate said drive member and chargeable in response to the movement of said support from its retracted to its advanced position.

10. The camera of claim 9 including means releasably locking said support in its retracted position.

* * * * *